US006317853B1

(12) United States Patent
Hikone et al.

(10) Patent No.: US 6,317,853 B1
(45) Date of Patent: Nov. 13, 2001

(54) APPARATUS FOR MAKING TEST DATA AND METHOD THEREOF

(75) Inventors: Kazunori Hikone, Naka-machi; Kazumi Hatayama, Hitachinaka; Takao Nishida, Kokubunji; Hiromichi Yamada, Hadano, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 08/847,592

(22) Filed: Apr. 24, 1997

(30) Foreign Application Priority Data

Apr. 24, 1996 (JP) .................................................. 8-102205

(51) Int. Cl.[7] .................................................. G01R 31/28
(52) U.S. Cl. .................................................. 714/738
(58) Field of Search .................................. 371/27.1, 27.4, 371/27.5, 27.2; 395/183.01, 183.09, 500; 714/738, 741, 742, 739, 25, 33

(56) References Cited

U.S. PATENT DOCUMENTS

| 4,996,659 | * | 2/1991 | Yamaguchi et al. | 364/579 |
| 5,719,881 | * | 2/1998 | Yonetoku | 371/27.1 |
| 5,754,561 | * | 5/1998 | Masui | 371/22.5 |

OTHER PUBLICATIONS

Lee et al., "Hierarchical Test Generation under Intensive Global Functional constraints", 29th ACM/IEEE Design Automatic Conference, 1992, paper 17.1, pp. 261–266.*

Konijnenburg et al., "Test Pattern Generation with Resistors", International Test Conference, 1993, paper 30.1, pp. 598–605.*

Vishakantaitah et al., "CHEETA: Composition of Hierarchical Sequential Tests Using ATKET", International Test Conference, 1993, paper 30.2, pp. 606–615.*

Lee et al., "Architectural Level Test Generation for Microprocessors", IEEE Transactions on computer–aided Design of Integrated Circuits & System, vol. 13 No. 10 Oct. 1994, pp. 1288–1300.*

* cited by examiner

Primary Examiner—Christine T. Tu
(74) Attorney, Agent, or Firm—Antonelli, Terry, Stout & Kraus, LLP

(57) ABSTRACT

An apparatus for providing test data used for detection of defects which occur in manufacturing functional blocks of a processor LSI is provided with a test pattern producing part for detecting a fault of the functional block at a block edge of the functional block, based on logic data of the functional block, with regard to one operation of the processor LSI which operates the functional block for the test data to be produced, the test pattern at the block edge of the functional block being such as to satisfy the conditions of an input signal to the block edge of the functional block when an instruction on the one operation is executed, and the conditions of an output signal from the block edge of the functional block being observable from the outside of the processor LSI when the instruction is executed. The apparatus also has an instruction sequence producing part for producing an instruction sequence in a machine language for the processor LSI by which an output from the block edge of the functional block becomes detectable at an external terminal of the processor LSI.

11 Claims, 12 Drawing Sheets

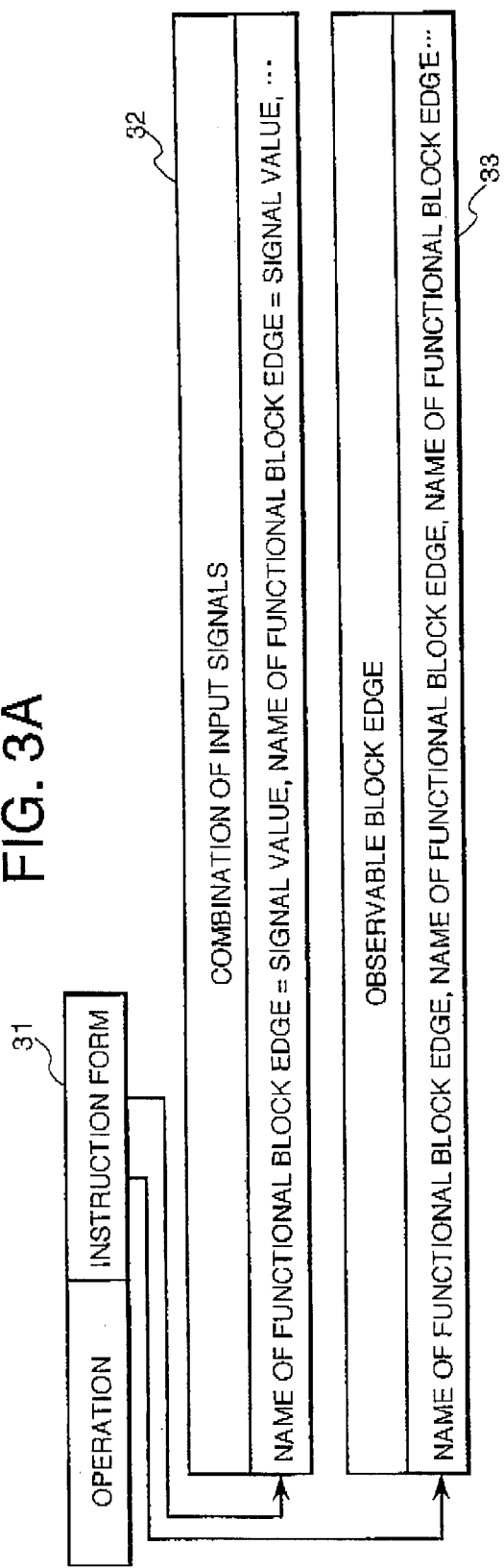
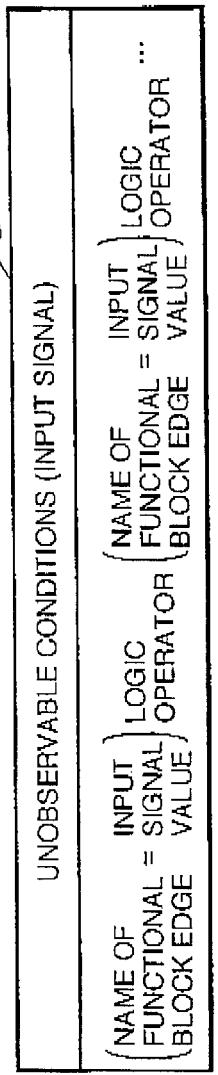
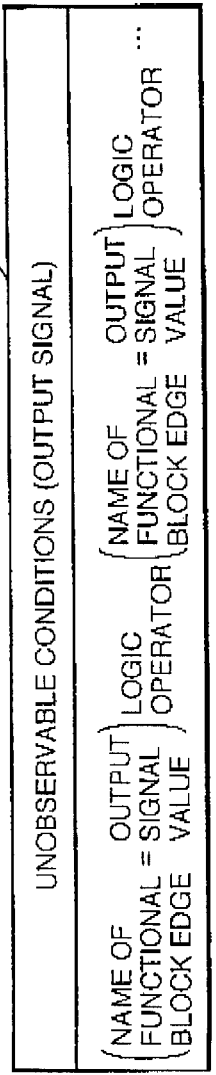
FIG. 3A
FIG. 3B
FIG. 3C

FIG. 4
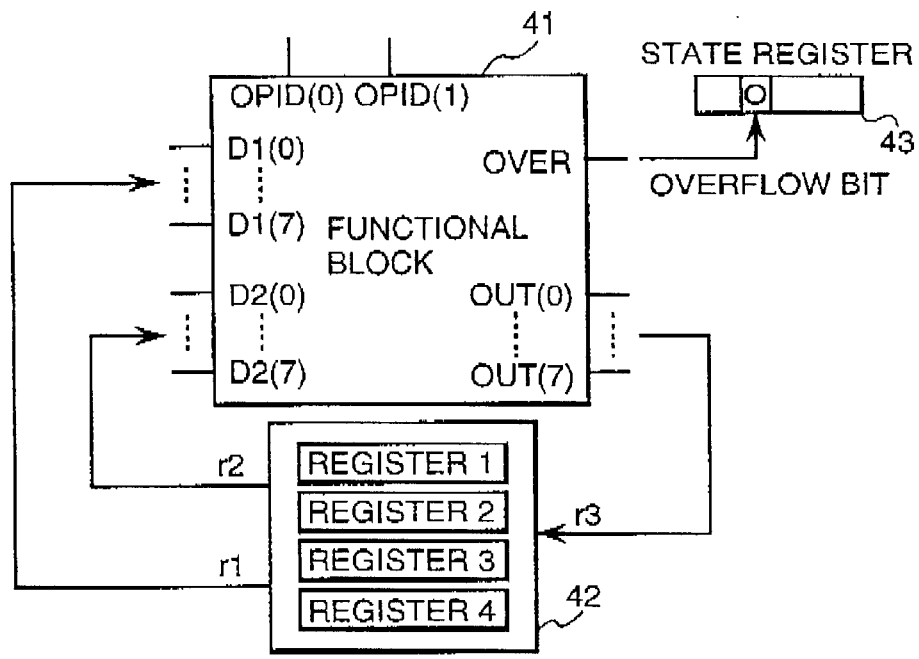
FIG. 4B
| OPERATION | INSTRUCTION FORM | | | |
|---|---|---|---|---|
| ADD 8 BITS | ADDL | r1, | r2, | r3 |
| ADD 4 BITS | ADDS | r1, | r2, | r3 |
| SUBTRACT 8 BITS | SUBL | r1, | r2, | r3 |
| SUBTRACT 4 BITS | SUBS | r1, | r2, | r3 |
FIG. 4C
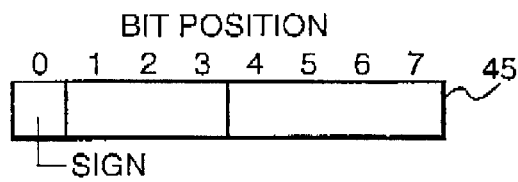
FIG. 4D
| OPERATION | INSTRUCTION FORM | | |
|---|---|---|---|
| REGISTER LOAD | LOAD | adr, | r |
| MEMORY STORE | STORE | r, | adr |

FIG. 5A

| INSTRUCTION FORM | INPUT SIGNAL CONDITION |
|---|---|
| ADDL r1, r2, r3 | OPID(0)=0, OPID(1)=0, |
| ADDS r1, r2, r3 | OPID(0)=0, OPID(1)=1, D1(4-7)=0, D2(4-7)=0 |
| SUBL r1, r2, r3 | OPID(0)=1, OPID(1)=0, |
| SUBS r1, r2, r3 | OPID(0)=1, OPID(1)=1, D1(4-7)=0, D2(4-7)=0 |

FIG. 5B

| INSTRUCTION FORM | OUTPUT SIGNAL CONDITION |
|---|---|
| ADDL r1, r2, r3 | OUT (0-7) |
| ADDS r1, r2, r3 | OUT (0-3) |
| SUBL r1, r2, r3 | OUT (0-7) |
| SUBS r1, r2, r3 | OUT (0-3) |

FIG. 5C

| UNOBSERVABLE CONDITIONS (INPUT SIGNAL) |
|---|
| {(D1(0)=0)+(D2(0)=0)}<br>*{(D1(1)=1)*(D2(1)=1)<br> +(D1(1)=1)*(D1(2)=1)*((D1(3)=1)*(D2(3)=1)+(D2(2)=1))<br>  +(D2(1)=1)*(D2(2)=1)*((D1(3)=1)*(D2(3)=1)+(D1(2)=1))<br>   +(D1(2)=1)*(D1(3)=1)*(D2(1)=1)*((D2(2)=1)+(D2(3)=1))<br>    +(D2(2)=1)*(D2(3)=1)*(D1(1)=1)*((D1(2)=1)+(D1(3)=1))}<br>+{(D1(0)=1)*(D2(0)=1)}<br> *{(D1(1)=0)*(D2(1)=0)<br>  +(D1(1)=0)*(D1(2)=0)*((D1(3)=0)*(D2(3)=0)+(D2(2)=0))<br>   +(D2(1)=0)*(D2(2)=0)*((D1(3)=0)*(D2(3)=0)+(D1(2)=0))<br>    +(D1(2)=0)*(D1(3)=0)*(D2(1)=0)*((D2(2)=0)+(D2(3)=0))<br>     +(D2(2)=0)*(D2(3)=0)*(D1(1)=0)*((D1(2)=0)+(D1(3)=0))} |

FIG. 5D

| UNOBSERVABLE CONDITIONS (OUTPUT SIGNAL) |
|---|
| OVER = 1 |

FIG. 6

| | i | 0 | 1 | 2 | 3 | 4 | 5 | 6 | 7 |
|---|---|---|---|---|---|---|---|---|---|
| TEST PATTERN | OPID(i) | 0 | 1 | - | - | - | - | - | - |
| | D1(i) | 0 | 0 | 1 | 1 | 0 | 0 | 0 | 0 |
| | D2(i) | 0 | 0 | 0 | 1 | 0 | 0 | 0 | 0 |
| | OUT(i) | 0 | 1 | 0 | 0 | 0 | 0 | 0 | 0 |

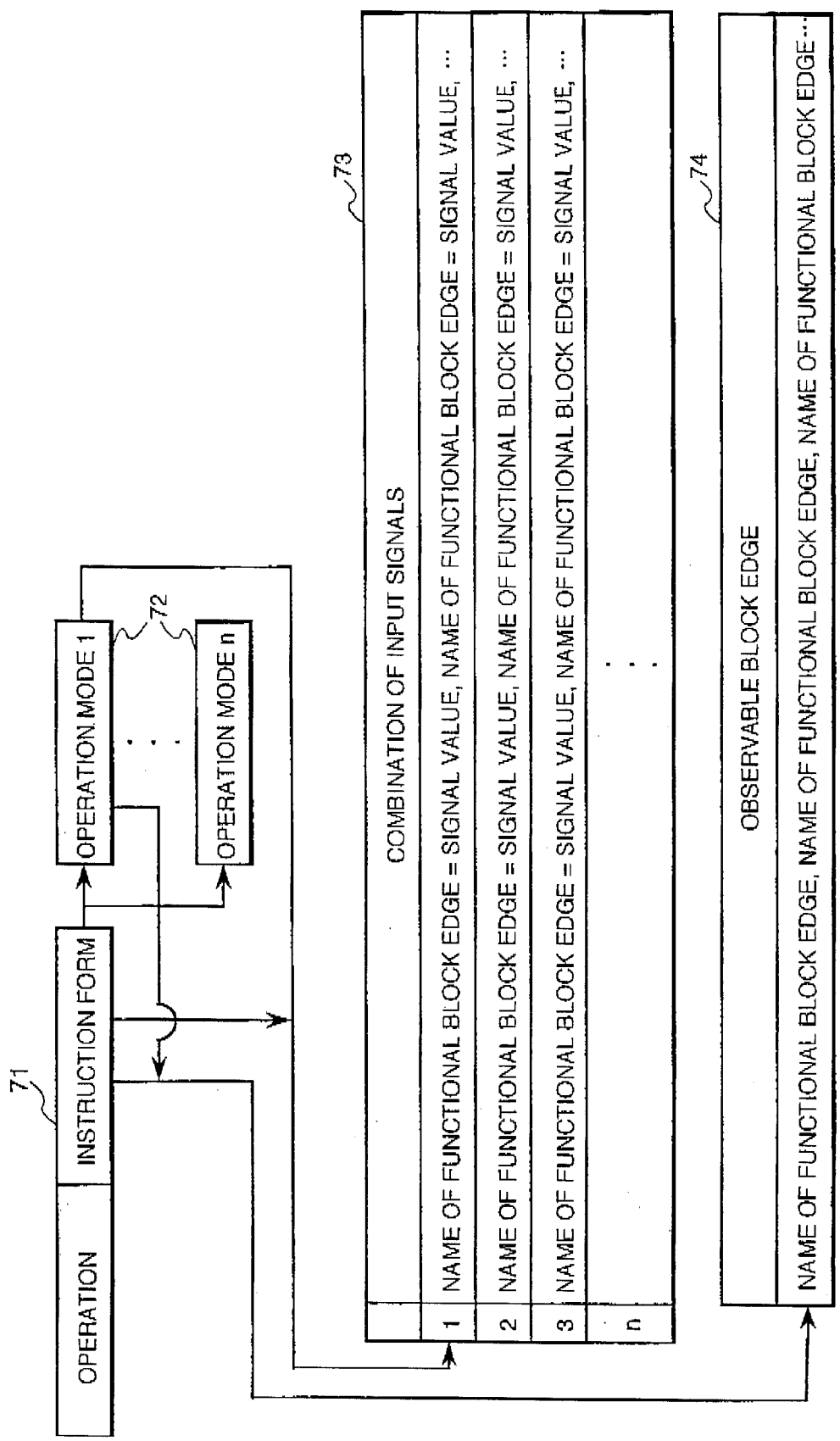

| OPERATION | INSTRUCTION FORM | | | OPERATION MODE |
|---|---|---|---|---|
| ADD 8 BITS | ADDL | r1, | r2, r3 | WITH SIGN |
| | | | | NO SIGN |
| ADD 4 BITS | ADDS | r1, | r2, r3 | WITH SIGN |
| | | | | NO SIGN |
| SUBTRACT 8 BITS | SUBL | r1, | r2, r3 | WITH SIGN |
| | | | | NO SIGN |
| SUBTRACT 4 BITS | SUBS | r1, | r2, r3 | WITH SIGN |
| | | | | NO SIGN |

FIG. 9

| INSTRUCTION FORM | OPERATION MODE | INPUT SIGNAL CONDITION |
|---|---|---|
| ADDL r1, r2, r3 | WITH SIGN | OPID(0)=0, OPID(1)=0, MODE=0 |
| | NO SIGN | OPID(0)=0, OPID(1)=0, MODE=1 |
| ADDS r1, r2, r3 | WITH SIGN | OPID(0)=0, OPID(1)=1, D1(4-7)=0, D2(4-7)=0, MODE=0 |
| | NO SIGN | OPID(0)=0, OPID(1)=1, D1(4-7)=0, D2(4-7)=0, MODE=1 |
| SUBL r1, r2, r3 | WITH SIGN | OPID(0)=1, OPID(1)=0, MODE=0 |
| | NO SIGN | OPID(0)=1, OPID(1)=0, MODE=1 |
| SUBS r1, r2, r3 | WITH SIGN | OPID(0)=1, OPID(1)=1, D1(4-7)=0, D2(4-7)=0, MODE=0 |
| | NO SIGN | OPID(0)=1, OPID(1)=1, D1(4-7)=0, D2(4-7)=0, MODE=1 |

FIG. 10

| | i | 0 | 1 | 2 | 3 | 4 | 5 | 6 | 7 |
|---|---|---|---|---|---|---|---|---|---|
| TEST PATTERN | OPID(i) | 1 | 0 | - | - | - | - | - | - |
| | D1(i) | 1 | 0 | 1 | 0 | 1 | 1 | 0 | 0 |
| | D2(i) | 0 | 0 | 0 | 1 | 1 | 1 | 1 | 0 |
| | OUT(i) | 1 | 0 | 0 | 0 | 1 | 1 | 1 | 0 |
| | MODE | 1 | - | - | - | - | - | - | - |

FIG. 12

| SUBL r1, r2, r3 | | |  121
|---|---|---|
| D1(0 ÷ 7) | r1 | REGISTER 1 |
| D2(0 ÷ 7) | r2 | REGISTER 2 |
| MODE | | SEVENTH BIT OF STATE REGISTER |

| SUBL r1, r2, r3 | | | 122
|---|---|---|
| OUT(0 ÷ 7) | r3 | REGISTER 3 |

FIG. 13

```
1  LOAD  100, REGISTER 1
2  LOAD  101, REGISTER 2
3  LOAD  102, STATE REGISTER
4  SUBL  REGISTER 1, REGISTER 2, REGISTER 3
5  STORE REGISTER 3, 103
```

FIG. 14

EXTERNAL MEMORY

| BEFORE EXECUTION | | AFTER EXECUTION | |
|---|---|---|---|
| ADDRESS | DATA | ADDRESS | DATA |
| 100 | 10101100 | 100 | 10101100 |
| 101 | 00011110 | 101 | 00011110 |
| 102 | 00000001 | 102 | 00000001 |
| 103 | 00000000 | 103 | 10001110 |

APPARATUS FOR MAKING TEST DATA AND METHOD THEREOF

BACKGROUND OF THE INVENTION

The present invention relates to an apparatus for producing test data to be used for detection of defects resulting during the manufacturing of a logic circuit, particularly to an apparatus for producing test data which can detect defects in a unit of a functional block of a processor LSI.

The cost of generating test data to be used for detection of defects which result during the manufacturing of logic circuit is increasing as the logic circuits become larger in scale. In order to decrease the cost of generating such test data, the test data is now produced by using an auxiliary circuit for testing. However, in many cases, it is required to operate the logic circuit at a high speed, or to decrease the area of the overall circuit as much as possible.

In the logic circuit required for high speed operation, it is very difficult to install an auxiliary circuit for testing, because the delay of a signal in the auxiliary circuit exceeds its allowable range. Further, in a circuit in which it is required to minimize the area of the circuit, there is a fear that the area of the auxiliary circuit for testing may exceed its allowable range. The extent of the difficulty of installation of the auxiliary circuit for testing and the possibility of the installation are different for every processor LSI, namely, for every functional block which is a component of the construction of the processor LSI.

While various methods are proposed in connection with the generation of test data for a logic circuit for which it is impossible to install auxiliary circuit for testing, the technique for generating in real time test data which can detect the defects which occur in manufacturing a logic circuit with high reliability has not yet been established. It is, therefore, extremely desirable to develop an actually useful method of producing test data.

An example of the prior art for producing test data in which an auxiliary circuit for testing can not be installed is disclosed on pages 28 to 37 of the paper titled "Essential: An Efficient Self-Learning Test Pattern Generation Algorithm For Sequential Circuits" by M. H. Schulz and E. Auth in "International Test Conference 1989" held in August, 1989. This paper describes an algorithm in which the test data generating problem is dealt with as a problem concerning a combination of signal values. In this regard, the combination of signal values, or the test data used to detect a fault, is searched by analyzing the logic data in a gate level with respect to the logic circuit for the test data to be made, selecting one of the circuit failures to be detected, and repeating the setting of the signal values and the cancellation of the setting of the signal values with respect to circuit terminals and inside signal lines. This processing is performed on all of the failures assumed in the logic circuit.

Further, because it is necessary to search the logic data of the whole processor LSI by using the algorithm, even when the test data for a functional block of the set processor LSI is made, the number of times the combination of signal values must be searched is extremely increased. As a result, it is very difficult to produce in real time test data which can indicate the defects in manufacturing of a logic circuit with high reliability.

SUMMARY OF THE INVENTION

An object of the present invention is to provide an apparatus for producing test date with efficiency and in a short time and which can detect defects in a unit of a functional block of a processor LSI.

An apparatus according to one aspect of the present invention has a test pattern producing part for detecting a fault in a functional block at a block edge of the functional block, based on logic data of the functional block, with regard to one operation of the processor LSI which operates the functional block for the test data to be produced, by producing a test pattern at the block edge of the functional block which satisfies the conditions of an input signal to the block edge of the functional block when an instruction on the one operation is executed, and determining the conditions of an output signal from the block edge of the functional block which is observable from the outside of the processor LSI when the instruction is executed; and an instruction sequence producing part for producing an instruction sequence in machine language for the processor LSI by which an output from the block edge of the functional block becomes detectable at an external terminal of the processor LSI.

A method according to another aspect of the present invention has the steps of: producing a test pattern for detecting a fault in a functional block at a block edge of the functional block, based on logic data of the functional block, with regard to one operation of the processor LSI which operates the functional block for the test data to be produced, by producing a test pattern at the block edge of the functional block which satisfies the conditions of an input signal to the block edge of the functional block when an instruction on the one operation is performed, and determining the conditions of an output signal from the block edge of the functional block which is observable from the outside of the processor LSI when the instruction is executed; and producing a test pattern at the block edge of the functional block, and producing an instruction sequence of machine language for the processor LSI by which an output from the block edge of the functional block becomes detectable at an external terminal of the processor LSI.

By referring to the conditions of an input signal to the block edge of the functional block when an instruction on the one operation is executed, and the conditions of an output signal from the block edge of the functional block which is observable from the outside of the processor LSI when the instruction is executed, when producing a test pattern for detecting a fault of the functional block, the test pattern which is generated becomes one which is chargeable to the instruction. Further, by combining an instruction used to set a state of the memory element necessary to execute the instruction with an instruction used to execute the instruction, it is possible to produce an instruction sequence which can detect defects in manufacturing of functional blocks of a processor LSI.

BRIEF DESCRIPTION OF THE DRAWINGS

These and other objects, features and advantages of the present invention will be understood more clearly from the following details description with reference to the accompanying drawings, wherein:

FIGS. 3A to 3C are diagrams showing input signal conditions and output signal conditions in the present invention.

FIG. 4A is a schematic diagram showing a functional block.

FIG. 4B is a chart showing the relationship between operations and instruction forms.

FIG. 4C is a diagram showing a bit position.

FIG. 4D is a chart showing the relationship between operations and instruction forms.

FIGS. 5A to 5D are charts of input signal conditions and output signal conditions in the first embodiment of the present invention.

FIG. 6 is a chart showing an example of the test pattern in a block edge of the functional block, produced on the basis of the input signal conditions and the output signal conditions in the first embodiment of the present invention.

FIG. 7 is a diagram of the input signal conditions and the output signal conditions in a second embodiment of the present invention.

FIG. 9 a chart illustrating the relationship among the instruction forms, the operation modes and the input signal conditions in the second embodiment of the present invention.

FIG. 10 is a chart showing an example of the test pattern in the block edge of the functional block, produced on the basis of the input signal conditions and the output signal conditions in the second embodiment of the present invention.

FIG. 12 is a chart showing an example of information corresponding to the input signals and that corresponding to the output signals in the instruction sequence producing part of the second embodiment of the present invention.

FIG. 13 is a diagram showing an instruction sequence of the machine language of the test data produced according to the present invention.

FIG. 14 is diagram showing test data in an external memory, produced according to the present invention.

DESCRIPTION OF THE PREFERRED EMBODIMENTS

Embodiments of the present invention will be explained hereinafter with reference to the drawings.

Figure 1:
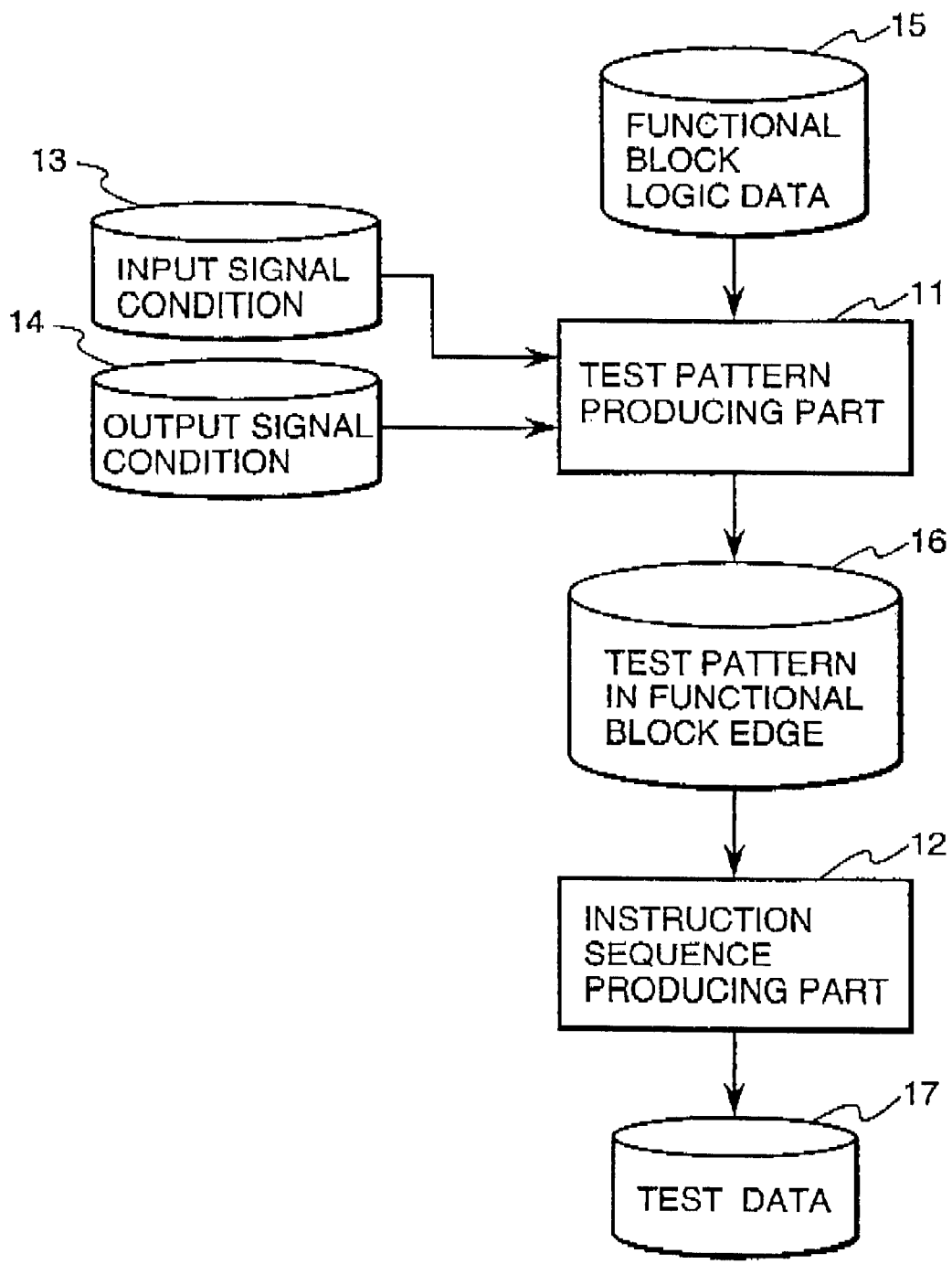
FIG. 1 is a schematic block diagram showing the overall configuration of an apparatus according to a first embodiment of the present invention.

FIG. 1 is a schematic diagram showing the overall configuration of an apparatus according to a first embodiment of the present invention.

The present apparatus makes test data used to detect a fault due to defects occurring in the manufacturing of a processor LSI, in particular test data used for the functional blocks to be detected. The processor LSI instruction sequence producing part is comprised of a set of logic circuits having various functions, which are called logic blocks. The design of the processor LSI is carried out individually for every functional block. Reference numeral 11 designates a test pattern producing part for producing test patterns used for the functional block. The test pattern is generated by assuming an inside fault based on gate level logic information, and obtaining the combination of input signals to a block edge of the functional block, which can detect effects due to an inside fault by using an external terminal of the processor. Reference numeral 12 designates an instruction sequence producing part for producing the instruction sequence used to detect the fault detected at the block edge of the functional block by the external terminal of the processor. In the instruction sequence producing part, the test date used to observe the operation of the function block from the external terminal of the processor LSI is produced by setting a test state to a register, etc. an assembler level. Reference numeral 13 designates means for indicating the condition of an input signal, 14 designates means for indicating the condition of an output signal, 15 designates logic data of a functional block at a gate level, 16 denotes a test pattern at a block edge of the functional block, and 17 denotes test data formed from an instruction sequence produced by the instruction sequence producing part 12.

In the present invention, it is assumed that it is impossible directly to access the functional blocks from the outside of the processor LSI. The gate level logic design information for the whole processor LSI is not analyzed to set a test signal for the functional block from the outside of the processor LSI. Namely, the test data for the functional block unit is produced by using the input/output signal conditions corresponding to the instruction of the processor LSI.

The input signal condition 13 is the condition of the input signal at the block edge of the functional block when an instruction based on one operation of the processor LSI is performed. The output signal condition 14 is the condition of the output signal at the block edge of the functional block observable in the processor LSI when this instruction is executed. The functional block logic data 15 is the logic design information at the gate level of each of the functional blocks. The test pattern producing part 11 can detect a fault inside of the functional block to be tested. The test pattern producing part 11 provides a signal pattern at the block edge of the functional block, which satisfies both the input signal condition 13 and the output signal condition 14, and outputs the signal pattern as a test pattern 16 in the functional block. The instruction sequence producing part 12 produces the machine language instruction sequence which can detect the fault detected at the block edge of the functional block from the external terminal of the processor LSI, and stores it as test data 17.

Figure 2:
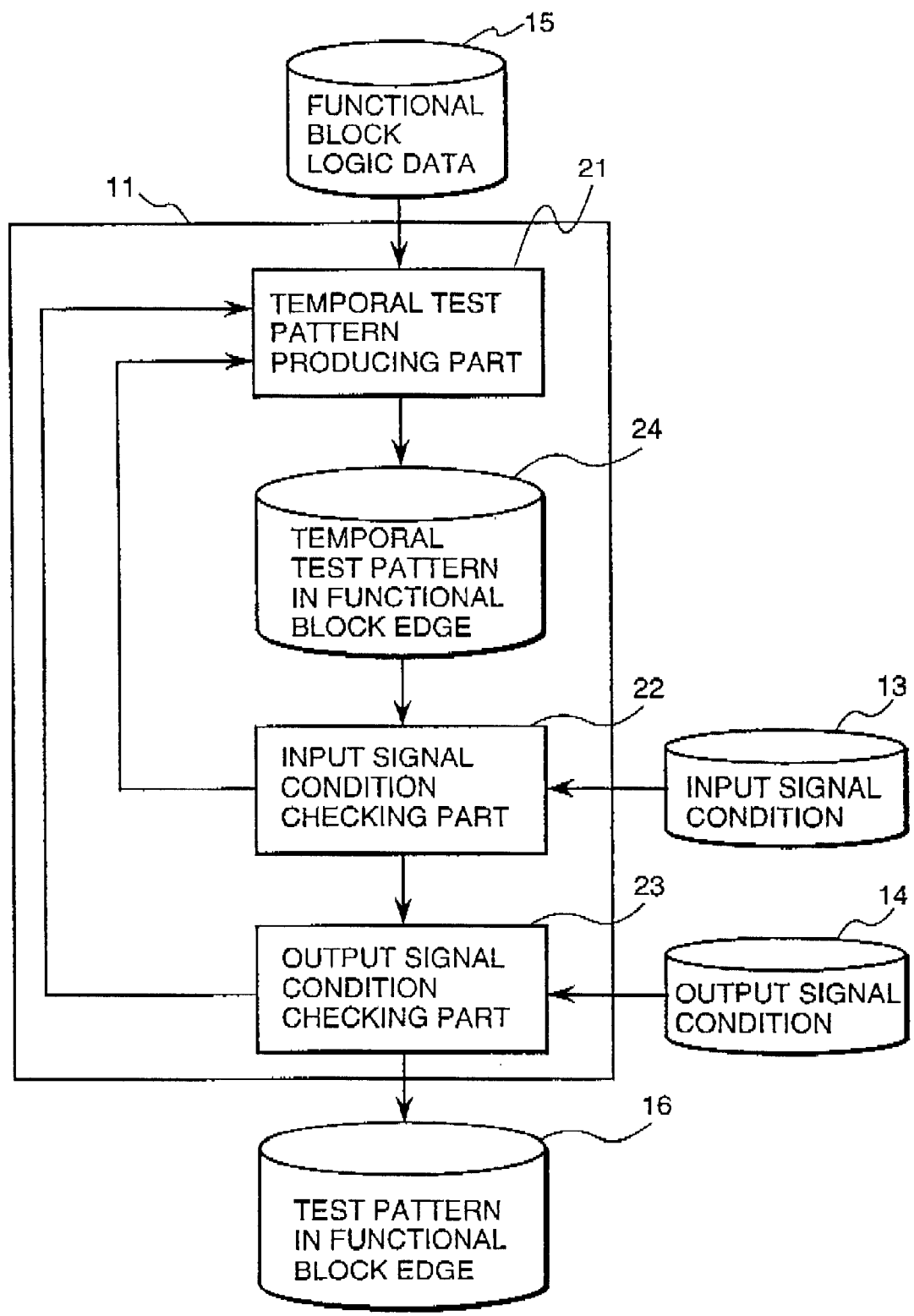
FIG. 2 is a schematic block diagram showing the configuration of a test pattern producing part in the first embodiment of the present invention.

FIG. 2 shows an example of the configuration of the test pastern producing part 11. In FIG. 2, reference numeral 21 designates a temporal test pattern producing part for producing a temporal test pattern by using a conventional technique for generating the test data, 22 denotes an input signal condition checking part, 23 denotes an output signal condition checking part, and 24 denotes a temporal test pattern in the functional block. In the temporal test pattern producing part 21, a signal pattern or the temporal test pattern 24 is produced. The faults inside of the functional block can be detected from the functional block logic data 15 shown in FIG. 1 at the block edge of the functional block by using the signal pattern. The input signal condition checking part 22 checks to see whether or not the temporal test pattern 24 satisfies the input signal condition 13. If it does not satisfy the input signal condition 13, another temporal test pattern is produced in the temporal test pattern producing part 21. In a similar way, the output signal condition checking part 23 checks to see whether or not the temporal test pattern which satisfied the input signal condition 13 satisfies the output signal condition 14. If it satisfies the output signal condition 14, this temporal test pattern is set as the test pattern 16 at the block edge of the functional block, otherwise, the temporal test pattern is discarded and another temporal test pattern is produced again in the temporal test pattern producing part 21.

FIG. 3A to FIG. 3C illustrate input signal conditions and output signal conditions. In FIG. 3A, reference numeral 31 designates a form of the instruction associated with operation of the processor LSI for operating the functional block for the test data to be produced. Further, the combination 32 of input signals designates the combination of the designation of the block edge of the functional block identified in accordance with the instruction form and the input signal at the block edge, and reference numeral 33 designates all or a part of the block edges picked-up out of the assembly of the block edges of the functional blocks in which the output signal at the block edge of the functional block obtained as a result of the execution of the instruction are observable from the external terminal of the processor LSI. When an unexpected signal is input to the functional block and thus an output signal can not be insured, or in the event of a combination of input/output signals by which the output signal can not be insured, the processor LSI must be designed in such a way that a control circuit for the functional block inhibits the transmission of the output signal to the outside of the processor LSI in some cases. In such a case, it is impossible to observe the output signal of the functional block from the outside of the processor LSI. For example, this corresponds to the function in which the result of operation is not transferred to a register when an overflow occurs during the execution of the operation.

Unobservable conditions (input signal) 34 refers to those conditions under which the functional block is in an unobservable state by an input signal. The unobservable conditions 34 comprise a combination of block edge and input signals at its block edge, which results in a state in which the output signal from the block edge of the functional block specified at 33 becomes unobservable from the outside of the processor LSI. The unobservable condition is expressed by a logical equation.

In the logical equation designated at 34, [name of block edge of functional block=value of input signal] is set to "truth" if the value of the signal of the block edge of the functional block is specified by using the name of the block edge, otherwise, it is set to "falsehood". If the result of the logical equation is "truth", then the output signal of the block edge of the functional block specified at 33 is unobservable.

The unobservable conditions (output) 35 represent unobservable conditions due to the output signal at the block edge of the functional block. The unobservable conditions 34 comprise a combination of output signals at its block edge, which results in a state in which output signals from the block edge of the functional block specified at 33 become unobservable from the outside of the processor LSI. The unobservable condition is expressed by a logical equation.

In the logical equation designated at 35, [name of block edge of functional block=value of input signal] is set to "truth" if the value of the signal obtained as a result of the execution of the instruction is equal to the value specified by the value of the output signal, otherwise, it is set to "falsehood". If the result of the logical equation is "truth", then the output signal of the block edge of the functional block specified at 33 is unobservable.

The test pattern producing part 11 can produce a test pattern at the block edge of the functional block adapted to the instruction by setting the condition that the value of the signal of the block edge of the functional block is fixed to the combination 32 of the input signals as an input signal condition 13, and setting the condition that a fault signal due to the effect of a failure which occurred in the functional block appears at the block edge of the functional block specified at the observable block edge 33 as an output signal condition 14.

Further, it is possible to prevent a possibility that the instruction sequence producing part 12 produces an instruction sequence which makes it impossible to detect the defects of the functional block, by adding the condition that the logical equation (34) indicative of unobservable conditions due to the input signals becomes false to the input signal condition 13 and/or the condition that the logical equation (35) indicative of unobservable conditions due to the output signals becomes false to the output signal condition 14, and producing a test pattern at the block edge of the functional block.

With respect to the input signal condition 13 and the output signal condition 14, concrete examples will be explained hereinafter.

Firstly, the functional block used to show the embodiment and its operation will be explained with reference to FIGS. 4A,4B, 4C and 4D. FIG. 4A shows a functional block. In FIG. 4A, reference numeral 41 denotes the functional block, OPID(0), OPID(1), D1(0) to D1(7), D2(0) to D2(7), OUT(0) to OUT(7), and OVER, respectively, designate names of the block edges of the functional block 41.

Reference numeral 42 designates a memory element having four 8-bit-registers (register 1 to register 4) for storing input/output signals of the functional block, and 43 designates a state register with 8 bits indicative of the state of operation of the functional block, which has an overflow bit or O bit indicative of the overflow of the result of operation. FIG. 4B shows the relationship between operations and instruction forms. In FIG. 4B, reference numeral 44 designates the assembler description concerning the operations for operating the functional block and the forms of the instructions corresponding to the operations. FIG. 4C shows bit positions 45 corresponding to data forms of the registers 42. FIG. 4D is the assembler description showing the relationship between operations and instruction forms used to observe from the external terminal of the processor LSI and set a signal to each of the memory element 42 and the state register 43.

In the functional block 41, four operations designated by block edges OPID(0) and OPID(1) are performed with respect to numeral data input to the block edges D1(0) to D1(7) and numeral data input to the block edges D2(0) to D2(7). If a set of values of the block edges OPID(0) and OPID(1) (OPID(0), OPID(1)) is (0,0), then 8-bit addition is performed. If (0,1), then 4-bit addition is performed. If (1,0), then 8-bit subtraction is performed. Further, if (1,1), then 4-bit subtraction is performed.

The result of the operation in the functional block 41 is output to the block edges OUT(0) to OUT(7). Further, if the result of the operation overflows, "1" is output to a block edge OVER, otherwise "0" is output.

The date type bit positions designated at 45 and dealt with in the functional block 41, respectively, correspond to D1(0) to D1(7), D2(0) to D2(7), and OUT(0) to OUT(7), and D1(0), D2(0), and OUT(0) indicate the 0th bit of the data. In the 8 bits of data, the 0th bit and the 1st bit to the 7th bit are represented by a sign bit and numerical bits, respectively. Further, negative numbers are represented by two's complement numbers. In the 4 bits of data, the 0th bit and the 1st bit to the 3rd bit are represented by a sign bit and numerical bits, respectively. Further, negative numbers are represented by two's complement numbers. When the type of data is changed to a decimal method, the integer of –128 to 127 in the 8 bits of data and the integer of –8 to 7 in the 4 bits of data are within the range dealt. If the result of operation is beyond the range dealt, an overflow occurs. It is assumed that if "0" is not input to all of D1(4) to D1(7) and D2(4) to D2(7), the result of the operation can not be insured.

It is assumed that there are four kinds of operations for operating the functional block 41, designated at 44. The instructions corresponding to the operations, respectively, carry out 8-bit addition, 4-bit addition, 8-bit subtraction, and 4-bit subtraction with one another among data stored in the two registers specified by r1 and r2 of the instruction forms out of the memory element 42. The result of the operations is stored in the register of the memory element 42 designated by r3. If the results of operations carried out by these instructions overflow, the state of the overflow is set to the overflow bit in the state register 43, and the result of operation is not transferred to the register designated by r3. The date type dealt by each of the instructions corresponding to the operations of the functional block is represented in the registers of the memory element 42 as follows. In the 8 bits of data, the 0th bit and the 1st bit to the 7th bit are represented by a sign bit and numerical bits, respectively. Further, negative numbers are represented by two's complement numbers. In the 4 bits of data, the 0th bit and the 1st bit to the 3rd bit are represented by a sign bit and numerical bits, respectively. Further, negative numbers are represented by two's complement numbers.

The operation which occurs at the time the instruction is executed will be explained next. Signals of the 0th bit to the 7th bit of the register corresponding to r1 of the instruction form are set to the block edges D1(0) to D1(7), and signals of the 0th bit to the 7th bit of the register specified by r2 are set to the block edges D2(0) to D2(7). (OPID(0), OPID(1)) is set to (0,0) for an ADDL instruction, (0,1) for an ADDS instruction, (1,0) for a SUBL instruction, and (1,1) for a SUBS instruction. The operation is performed in the functional block 41 and its numerical result is obtained from OUT(0) to OUT(7). The result of the determination as to whether or not the result of operation has overflowed is obtained from OVER. The output signals from OUT(0) to OUT(7) are stored in the corresponding 0th bit to 7th bit of the register specified by r3, and the output signal from OVER is stored at the overflow bit 0 of the state register 43. Further, the value "0" is set to D1(4) to D1(7) and D2(4) to D2(7), by masking the signal values of the 4th bit to the 7th bit of the register with "0". The output signals from OUT(4) to OUT(7) are processed in a similar way.

A register load operation designated by 46 acts to transfer the data of the external memory connected to the processor LSI including the functional block to a register. It transfers the content of the memory at the address specified by adr of the instruction form to the register specified by r. Thereby the setting of values to registers for the purpose of a test is performed. Further, the memory store operation acts to transfer the data of a register to the external memory. It transfers the content of the register specified by r to the memory with the address specified by adr. Thereby the output signals from the block edge of the functional block become observable from the external terminal of the processor LSI via the register specified by r3.

FIG. 5A to 5D shows input signal conditions and output signal conditions in the first embodiment of the present invention. Reference numeral 51 of FIG. 5A designates instruction forms, block edges of the functional block 41 identified according to the instruction forms, and the input signal conditions or the combination of input signals to the block edges. For example, in ADDS r1, r2, r3 of the instruction forms, OPID(0)=0 and OPID(0)=0 is defined as the input signal conditions in order to allow the functional block to carry out 4-bit addition. Further, because D1(4) to D1(7) and D2(4) to D2(7) are set to "0" when 4-bit addition is performed, D1(4–7)=0 and D2(4–7)=0 are defined as the input signal conditions. Here, D1(x–y) designates terminals of the block edges D1(x) to D1(y). Reference numeral 52 designates the output signal conditions, that is, all or a part of the block edges picked-up out of the assembly of the block edges of the functional blocks in which the output signal at the block edge of the functional block obtained as a result of the execution of the instruction are observable from the external terminal of the processor LSI. For example, in ADDS r1, r2, r3 of the instruction forms, OUT(4–7) is masked with "0" and transferred to the register in the 4-bit operation. Therefore, while the observable block edges are OUT(0–3) and OVER, OUT(0–3) is defined as the output signal condition.

Reference numeral 53 designates a signal condition under which an output signal from the block edge becomes unobservable from the external terminal of the processor LSI in response to an input signal. It indicates the unobservable conditions (input signal) in which the combination of the input signals, by which the output signal OUT(0–3) specified according to the ADDS r1, r2, r3 of the instruction form becomes unobservable, is defined. In this case, the combination of the input signals by which the result of the 4-bit addition is overflowed is represented by the logical equation.

Reference numeral 54 designates a signal condition under which an output signal from the block edge becomes unobservable from the external terminal of the processor LSI, by using an output signal. It indicates the unobservable conditions (output signal) in which the combination of the output signals, by which the output signal of the OUT(0–3) specified according to the ADDS r1, r2, r3 of the instruction form becomes unobservable, is defined. In this case, the output signal OVER=1 indicative of an overflow is designated. By producing a test pattern using the combination of the output signal conditions 52 and the input signal conditions 51 corresponding to the ADDS r1, r2,r3 of the instruction form, the test pastern becomes changeable from the test pattern at the block edge to the instruction applied to the functional block. Further, by producing a test pattern by adding the unobservable conditions 53 to the input signal or by adding the unobservable conditions 54 to the output signal, the output result can be always changed to the instruction sequence observable from the external terminal of the processor LSI when the functional block is operated by applying the test pattern to the functional block.

FIG. 6 is an example of the test pattern which satisfies the input signal conditions 51 and the output signal conditions 52 with respect to the instruction form ADDS r1, r2, r3 pre-specified in order to produce the test pattern, or the input signal conditions to which the unobservable conditions 53 are added and the output signal conditions to which the unobservable conditions 54 are added. This test pattern satisfies OPID(0)=0, OPID(0)=1, D1(4–7)=0 and D2(4–7)= 0, in addition to the fact that the result of addition does not overflow.

Examples of the input signal conditions and the output signal conditions will be explained next, in which such an operation mode not specified by the instruction modes is included in the instruction based on the operation of the processor LSI for working the functional block for the test data to be produced.

FIG. 7 shows input signal conditions and output signal conditions in a second embodiment of the present invention. In FIG. 7, reference numeral 71 designates a form of the instruction associated with operation of the processor LSI for operating the functional block for the test data to be produced. 72 designates operation modes 1 to n specified by conditions other than the instruction forms when the instruction is executed. Combination 73 of input signals designates the combination of the block edges of the functional block identified in accordance with the combination of the instruction form and the operation mode, and the input signals at the block edge. Reference numeral 74 designates observable block edges, that is, all or a part of block edges picked-up out of the assembly of the block edges of the functional blocks in which the output signal at the block edge of the functional block obtained as a result of the execution of an instruction in a case where the operation mode 72 is in an operation mode 1, are observable from the external terminal of the processor LSI. The test pattern producing part 11 can produce a test pattern at the block edge of the functional block adapted to the instruction with ah operation mode specified by other than the instruction forms by setting the combination 73 of the input signals as an input signal condition 13, and setting the observable block edge 74 as an output signal condition 14.

Further, it is possible to prevent the possibility that the instruction sequence producing part 12 produces an instruction sequence, which is not able to detect the defects of the functional block from the test pattern at the block edge of the functional block produced by the test pattern producing part 11, by defining the unobservable conditions due to the input signal when the instruction is executed in an operation mode in a similar way to conditions 34 and adding it to the input signal condition 13, and by defining the unobservable conditions due to the output signal when the instruction is executed in an operation mode in a similar way to condition 35 and adding it to the output signal conditions.

In a case where the instruction has operation modes, an embodiment on the input signal conditions and the output signal conditions will be explained hereinafter.

Figures 8A, 8B:
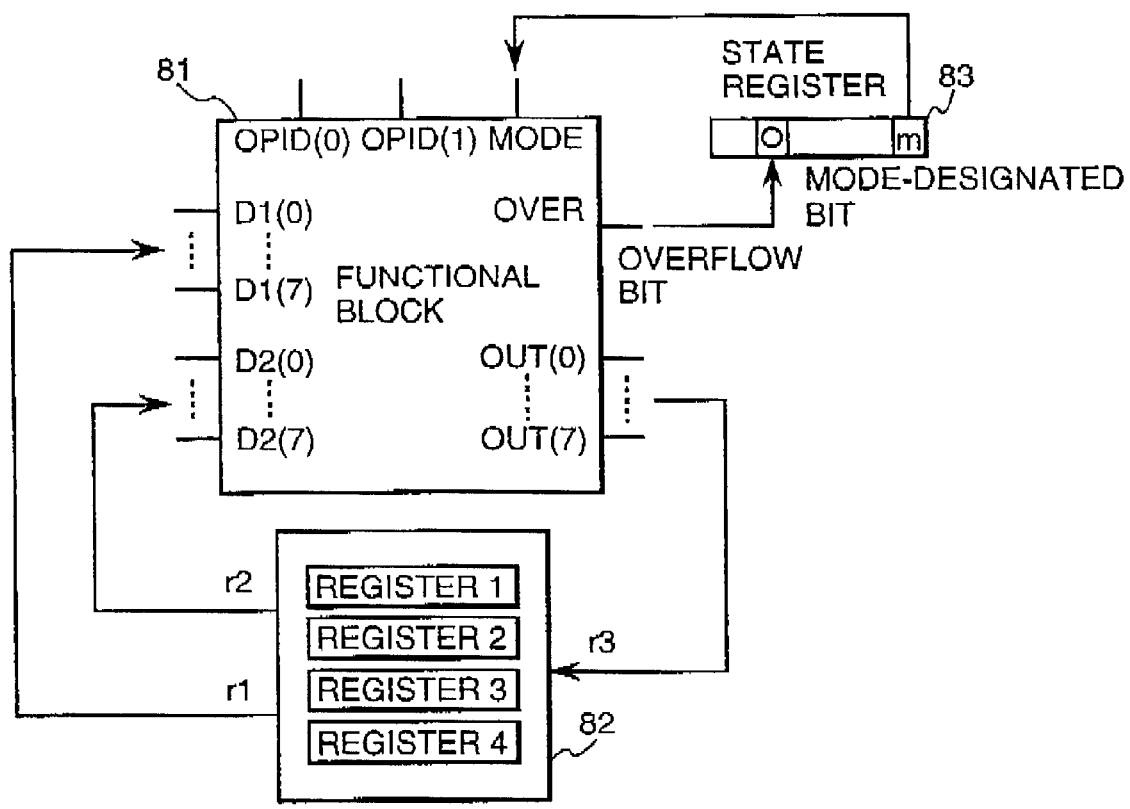
FIG. 8A is a schematic diagram showing a functional block.
FIG. 8B is a chart showing the relationship among operations, instruction forms and operation modes.

FIG. 8A shows a functional block. FIG. 8B shows the relationship among operations, instruction forms and operation modes. In FIG. 8A, reference numeral 81 designates the functional block. OPID(0), OPID(1), D1(0) to D1(7), D2(0) to D2(7), OUT(0) to OUT(7), OVER and MODE, respectively, designate names of the block edges of the functional block 81. Reference numeral 82 designates a memory element having four 8-bit registers (register 1 to register 4) for storing input/output signals of the functional block, and 83 designates a state register with 8 bits indicative of the state of operation of the functional block, which has an overflow bit or 0 bit indicative of an overflow of the result of operation, and a mode-designated bit or m bit, for specifying the operation mode of the instruction. In FIG. 8b, reference numeral 84 designates the assembler description concerning the operations for operating the functional block, the forms of the instructions corresponding to the operations and the operation mode of each instruction.

In the functional block 81, four operations designated by block edges OPID(0) and OPID(1) are performed with respect to numeral data input to the block edges D1(0) to D1(7) and numeral data input to the block edges D2(0) to D2(7). If a set of values (OPID(0), OPID(1) of the block edges OPID(0) and OPID(1) is (0,0), then 8-bit addition is performed. If (0,1), then 4-bit addition is performed. If (1,0), then 8-bit subtraction is performed. If (1,1), then 4-bit subtraction is performed. The result of the operation in the functional block 81 is output to the block edges OUT(0) to OUT(7). Further, if the result of the operation overflows, "1" is output to block edge OVER, otherwise "0", is output.

The difference in operation between the functional blocks 41 and 81 resides in that the operation of the functional block 81 is performed in two operation modes. One of the operation modes is a mode in which an operation on numerical data with a sign is carried out in the same way as the functional block shown in FIG. 4. This mode is employed when the mode of the functional block 81 is set to "0". The other mode is a mode in which an operation on numerical data having no sign is carried out. This mode is employed when the mode of the functional block 81 is set to "1". The numerical data having no sign uses the 0th bit of a memory register 42 of FIG. 4 not as a sign bit, but as numerical data. The integer dealt is within the range of 0 to 15 (decimal expression) in the case of 4 bits, and within the range of 0 to 255 in the case of 8 bits. If the result of operation in the functional block 81 exceeds the range, an overflow occurs. When the instruction is executed, the signal value of the mode-designated bit (m bit) of a state register 83 is transferred to and set to the MODE block edge.

It is assumed that the operation for operating the functional block 81 and the instruction and its form are the same as designated by 44 of FIG. 4B, as shown by 84 of FIG. 8B. The operation of the instruction is the same as in FIG. 4 except for dealing with two kinds of numerical data specified by the MODE. Further, as an instruction to set the signal value, the instruction designated by 46 of FIG. 4D is provided.

Referring now to FIG. 9, there is shown the relationship among the instruction forms, the operation modes and the input signal conditions in the second embodiment of the present invention.

If the instruction form is SUBL r1, r2, r3 and the operation mode has no sign, the input signal value OPID(0)=1 and OPID(1)=0 are defined in order to carry out 8-bit subtraction in the functional block. Further, in order to carry out the operation in a no sign mode, MODE=1 is defined, and the combination of the values of the input signals is set to the input signal condition.

As the output signal condition in each instruction form, OUT(0–7) in which the result of 8-bit subtraction is transferred to registers is defined in a way similar to that shown by the conditions 52 of FIG. 5B. Further, as an unobservable condition due to the input signal in the 8-bit subtraction, a signal value having the combination of a numerical value which results in a negative result of subtraction is defined, which is the condition wherein the result of operation overflows. It is possible to prevent the production of the test pattern that causes the OUT(0–7) to be unobservable due to overflow by adding the above-mentioned unobservable condition to the input signal condition.

FIG. 10 is an example of a test pattern which satisfies the input signal conditions and the output signal conditions defined as mentioned above when the instruction form ADDS, r1, r2, r3, has no sign. This test pattern at the block edge satisfies OPID(0)=1, OPID(1)=0, and MODE=1, in addition to the fact that the result of subtraction does not become negative.

Figure 11:
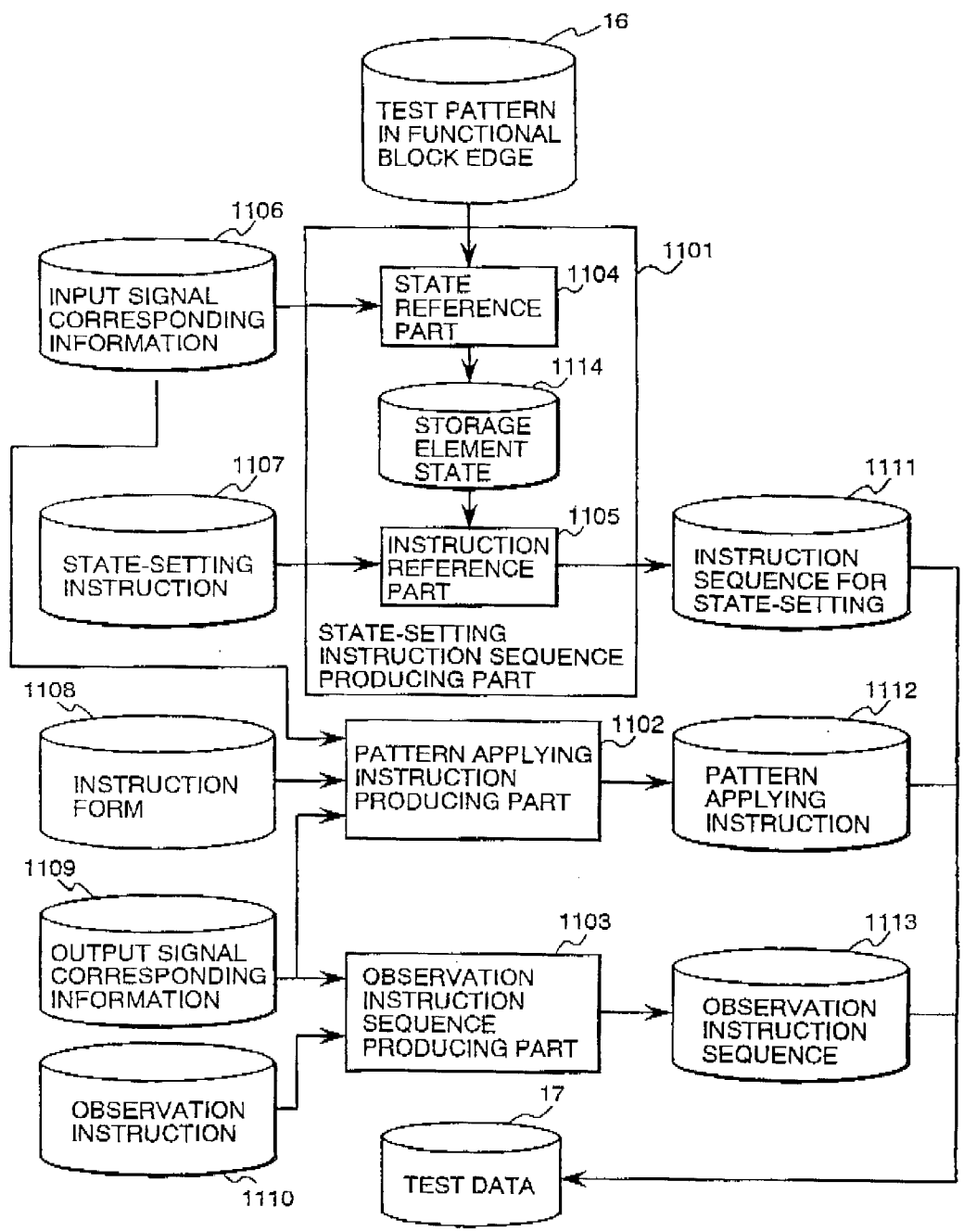
FIG. 11 is a block diagram of an instruction sequence producing part in the second embodiment of the present invention.

FIG. 11 shows the detailed configuration of the instruction sequence producing part 12 shown in FIG. 1.

The instruction sequence producing part is further divided into three parts, a state-setting instruction sequence producing part 1101, a pattern applying instruction producing part 1102 and an observation instruction sequence producing part 1103. In the instruction sequence producing part, the test data 17 to observe the data at the block edge of the functional block is produced by controlling the data at the block edge of the functional block by setting data to the registers in the assembler level, thus reflecting the result of operation of the functional block, and by outputting it to the external terminal of the processor LSI.

The operation of the state-setting instruction sequence producing part 1101 is as follows.

When the instruction, the object for which the test pattern 16 at the block edge of the functional block is produced, is executed in the functional block to be tested, the input signal at the block edge of the functional block is checked against input signal corresponding information 1106 indicative of the relationship corresponding to a signal of a memory element necessary to apply the input signal to the block edge in a state reference part 1104. Next, the states of various memory elements in the processor LSI necessary to apply the test pattern to the functional block is calculated, and the result of calculation is output to storage (memory) element state 1114. A state-setting instruction 1107 in which the definition of the instruction corresponding to the operation for setting values to the storage element state 1114 and the memory element is stored, is referred to in an instruction reference part 1105. In order to set the state of the storage element state 1114 to each of the registers, a state-setting instruction sequence 1111 is produced and stored as the test data 17.

The operation of the pattern applying instruction producing part 1102 is as follows.

The input signal corresponding information 1106 and the instruction form 1108 of the instruction for the predetermined test pastern to be produced are referred to. A signal designated by the test pattern 16 at the block edge of the functional block is applied to the functional block, and a machine language instruction for operating the functional block is produced. The machine language instruction is added to the test data 17 as a pattern applying instruction 1112.

The operation of the observation instruction sequence producing part 1103 is as follows.

By referring to an output signal corresponding to information indicative of the corresponding relationship between an output signal at the block edge obtained when the predetermined instruction for the test pattern to be made is executed and a memory element for the output signal to be transferred, the machine language instruction sequence is produced in such a manner that the output signal at the block edge of the functional block after the predetermined instruction is executed can become observable from the external terminal of the processor LSI. This machine language instruction sequence is added to the test data 17 as an observation instruction sequence 1113.

An example concerning the operation of the above embodiment will be explained. The test pattern shown in FIG. 10 produced for the functional block of FIG. 8 is used for explanation. The state-setting instruction 1107 and the observation instruction 1110 correspond to the instruction designated by 46 of FIG. 4, and the instruction form 1108 corresponds to the matter designated by 84 of FIG. 8. The input signal corresponding information 1106 is designated by 121 of FIG. 12, and the output signal corresponding information 1109 is designated by 122 of FIG. 12.

Here, 121 of FIG. 12 designates that the signal value of the register specified by r1 is set to the block edge D1(0–7) of the functional block when an instruction with the instruction form SUBL r1, r2, r3 is executed, and the register 1 is assigned as the register. Further, the signal value of the register specified by r2 is set to the block edge D2(0–7) of the functional block when an instruction with the instruction form SUBL r1, r2, r3 is executed, and the register 2 is assigned as the register. Furthermore, the 7th bit of the state register is set to the block edge MODE as the mode-designated bit (mbit). Also, 122 of FIG. 12 designates that the signal value obtained at the block edge OUT(0–7) of the functional block, in response to the execution of the instruction to apply a signal to the functional block, is transferred to the register specified by r3.

FIGS. 13 and 14 show examples made on the basis of the test pattern at the block edge of the functional block shown in FIG. 10. In FIG. 13, the machine language instruction sequence of the test pattern is represented at the assembler level. In more detail, FIG. 14 shows addresses of the external memory and data stored at the addresses before and after the execution of the test data.

In this example, the operation as described below is performed in the state-setting instruction sequence producing part 1101, by referring the input signal corresponding information 1106 designated by 121 of FIG. 12 and the test pattern 16 at the block edge of the functional block shown in FIG. 10, the state reference part 1104 operates to set a signal (10101100) to the register signal (00011110) to the register 2, and a signal (00000001) to the state register. The combination of these signals forms the memory element state 1114. The instruction reference part 1105 refers the instruction designated by 46 of FIG. 4D registered at the state-setting instruction 1107 and the memory clement state 1114, obtains machine language instruction LOAD, adr1, register 1 for the register 1, machine language instruction LOAD adr2, register 2 for the register 2, machine language instruction LOAD adr3, state register for the state register, as a source of the state-setting instruction or the original form of the state-setting instruction sequence, determines available addresses of the external memory for adr1, adr2, adr3, and operates to store the setting data to the external memory. In this example, the value (10101100) is stored at the adr1 or address No. 100, the value (00011110) is stored at the adr2 or address No. 101, and the value (00000001) is stored at the adr3 or address No.102. This definition of an address is associated with the state-setting instruction and is stored as the state-setting instruction sequence or the test data along with the data stored in the external memory.

The pattern applying instruction producing part refers to the input signal corresponding information 1106 designated by 121 of FIG. 12 and the instruction form 1108 designated by 84 of FIG. 8B, obtains the machine language SUBL register 1, register 2, register 3 as the pattern applying instruction 1112, and additionally registers them as the test data.

The observation instruction sequence producing part 1103 refers to the output signal corresponding information 1109 designated by 122 of FIG. 12 and the instruction designated by 46 of FIG. 4D and stored to the observation instruction 1110, obtains STORE, register 3, adr as the source of the observation instruction sequence 1113, and determines the address of the external memory available to the adr. The determined address is associated with the observation instruction sequence. The result is add as the observation instruction sequence 1113 or test data along with the data (10001110) transferred to the external memory. In this example, the address adr is No.103.

The instructions No. 1 to 3 of FIG. 13 are the state-setting instruction sequence 1111 produced by the state-setting instruction sequence producing part 1101, the instruction No.4 is the pattern applying instruction 1112 produced by the pattern applying instruction producing part 1102, and the instruction No.5 is the observation instruction sequence 1113 produced by the observation instruction sequence producing part 1103.

The signal data of the external memory before the execution shown in FIG. 14 is one used for the state-setting produced by the state-state instruction sequence producing part 1101, and the signal data after execution is data to which data to be transferred to the external memory, produced by the observation instruction sequence producing part 1103 is added.

What is claimed is:

1. An apparatus for producing test data used for detection of defects which occur in manufacturing function blocks of a processor LSI, comprising:

a test pattern producing part for: 1) detecting a fault at a block edge of a function block, based on logic data of the function block, with regard to one operation of the processor LSI which operates the function block for the test data to be produced, and 2) applying the test pattern to a block edge of the function block, said test pattern satisfying the conditions of an input signal to the block edge of the function block when an instruction utilizing the one operation is executed by the processor, and the conditions of an output signal from the block edge of the function block are observable from the outside of the processor LSI when the instruction is executed; and an instruction sequence producing part for producing an instruction sequence of machine language for the processor LSI by which an output from the block edge of the function block becomes detectable at an external terminal of the processor LSI.

2. An apparatus for producing test data according to claim 1, wherein said instruction sequence producing part includes:

a state-setting instruction sequence producing part for producing a first machine language instruction sequence for the processor LSI used to set a state of a memory element necessary to apply the test pattern from the memory element to the function block, in accordance with the test pattern and the information indicative of the corresponding relationship between the input signal to the block edge of the function block and a signal of the memory element necessary to apply the input signal;

a pattern applying instruction producing part for producing a machine language instruction for the processor LSI used to apply the test pattern to the function block; and an observation instruction sequence producing part for producing a second machine language instruction sequence for the processor LSI used to observe the output signal obtained as a result of the execution of the machine language instruction in the function block from the outside of the processor LSI.

3. An apparatus for making test data according to claim 1, wherein said conditions of the input signal in said test pattern producing part are the combination of the values of the input signals to the block edge of the function block, the values of the input signals being identified in accordance with an instruction form of the instruction, and said conditions of the output signal are a subset or all elements picked-up out of the assembly of the output signals at the block edge of the function block observable from the external terminal of the processor LSI, the output signals being obtained at the block edge as a result of the execution of the instruction.

4. An apparatus for producing test data according to claim 3, wherein the combination of values of the input signals, in a case where the output signal included in the conditions of the assembly of output signals becomes unobservable at the block edge, is added to the conditions of the input signal in said test pattern producing part.

5. An apparatus for producing test data according to claim 3, wherein the combination of the output signal from the block edge of the function blocks, included in the conditions of the output signals becomes unobservable at the external terminal of the processor LSI and the block edge of the function block, is added to the conditions of the output signal in said test pattern producing part.

6. A method of producing test data used to detect defects which occur in manufacturing function blocks of a processor LSI, comprising the steps of:

producing a test pattern for: 1) detecting a fault at a block edge of a function block, based on logic data of the function block, with regard to one operation of the processor LSI which operates the function block for the test data to be produced, and 2) applying the test pattern to a block edge of the function block, said test pattern satisfying the conditions of an input signal to the block edge of the function block when an instruction utilizing the one operation is executed by the processor, and the conditions of an output signal from the block edge of the function block are observable from the outside of the processor LSI when the instruction is executed; and producing a test pattern at the block edge of the function block, and producing an instruction sequence of machine language for the processor LSI by which an output from the block edge of the function block becomes detectable at an external terminal of the processor LSI.

7. A method of producing test data according to claim 6, wherein said instruction sequence producing step includes:

producing a first machine language instructions sequence for the processor LSI used to set a state of a memory element necessary to apply the test pattern from the memory element to the function block, in accordance with the test pattern and the information indicative of the corresponding relationship between the input signal to the block edge of the function block and a signal of the memory element necessary to apply the input signal;

producing a machine language instructions for the processor LSI used to apply the test patterns to the function block; and producing a second machine language instructions sequence for the processor LSI used to observe the output signal obtained as a result of the execution of the machine language instructions in the function block from the outside of the processor LSI.

8. A method of producing test data according to claim 6, wherein said conditions of the input signal is a combination of values of input signals to the block edge of the function block, the values of the input signals being identified in accordance with an instruction form of the instruction, and said conditions of the output signal is a group of output signals at a block edge of the function block observable from the external terminal of the processor LSI, the output signals being obtained at the block edge as a result of the execution of the instruction.

9. A method of producing test data according to claim 8, wherein the combination of values of the input signals, in a case where the output signal included in the conditions of the output signals become unobservable at the block edge, is added to the conditions of the input signal.

10. A method of producing test data according to claim 8, wherein the combination of the output signal from the block edge of the function blocks, included in the conditions of the output signals becomes unobservable at the external terminal of the processor LSI and the block edge of the function block, is added to the conditions of the output signal.

11. A test data generating apparatus comprising:

a test pattern producing part for producing a test pattern satisfying a condition of an input data to be applied to a function block by an instruction to be executed by a processor and a condition of an output data to be applied to a function block of said processor by said instruction, on the basis of a logic data of said function block said processors; and instruction producing part for producing said instruction to be applied to said processor for outputting data output from said function block on the basis of an instruction with which said processor performs external access and the test pattern produced by said test pattern producing part.

* * * * *